(12) United States Patent
Declerck

(10) Patent No.: US 7,838,109 B2
(45) Date of Patent: Nov. 23, 2010

(54) FILM FOR PACKING LIQUIDS OR THE LIKE AND METHOD FOR MANUFACTURING SUCH A FILM

(75) Inventor: Johan Willy Declerck, Grimbergen (BE)

(73) Assignee: Tekni-Plex Europe, naamioze vennootschap

( * ) Notice: Subject to any disclaimer, the term of this patent is extended or adjusted under 35 U.S.C. 154(b) by 192 days.

(21) Appl. No.: 10/583,450

(22) PCT Filed: Dec. 18, 2003

(86) PCT No.: PCT/BE03/00226

§ 371 (c)(1),
(2), (4) Date: Jun. 19, 2006

(87) PCT Pub. No.: WO2005/058586

PCT Pub. Date: Jun. 30, 2005

(65) Prior Publication Data

US 2007/0141326 A1    Jun. 21, 2007

(51) Int. Cl.
*B32B 27/08*     (2006.01)
*B32B 27/30*     (2006.01)
*B32B 27/32*     (2006.01)

(52) U.S. Cl. .................. 428/339; 428/421; 428/422; 428/522; 428/523

(58) Field of Classification Search ............... None
See application file for complete search history.

(56) References Cited

U.S. PATENT DOCUMENTS

| 4,370,187 A | 1/1983 | Katagiri et al. |
| 5,366,839 A | 11/1994 | Aoki |
| 6,306,503 B1 | 10/2001 | Tsai |
| 6,432,542 B1 | 8/2002 | Tsai |
| 6,592,978 B1 | 7/2003 | Miller et al. |
| 2001/0008694 A1 | 7/2001 | Tsai et al. |
| 2002/0197478 A1 | 12/2002 | Muggli et al. |
| 2003/0008152 A1 | 1/2003 | Tsai et al. |

FOREIGN PATENT DOCUMENTS

| DE | 203 06 931 | 8/2003 |
| EP | 0 112 406 | 7/1984 |
| EP | 1 013 193 | 6/2000 |
| EP | 1 287 909 | 3/2003 |
| EP | 1 364 638 | 11/2003 |
| JP | 63-224944 | 9/1988 |
| WO | WO 93/06159 | 4/1993 |
| WO | WO 03/091019 | 11/2003 |

OTHER PUBLICATIONS

Derwent abstract of JP 63-224944 A, Sep. 1988.*

* cited by examiner

*Primary Examiner*—Ramsey Zacharia
(74) *Attorney, Agent, or Firm*—Bacon & Thomas, PLLC

(57) ABSTRACT

Film for packaging liquid products or the like, which mainly consists of a first polyolefin layer, a jointing layer and a layer of polychlorotrifluoroethylene (PCTFE), wherein the PCTFE Layer has a thickness of at least 10 micrometer (μm) and whereby the film is obtained by means of extrusion lamination.

6 Claims, 2 Drawing Sheets

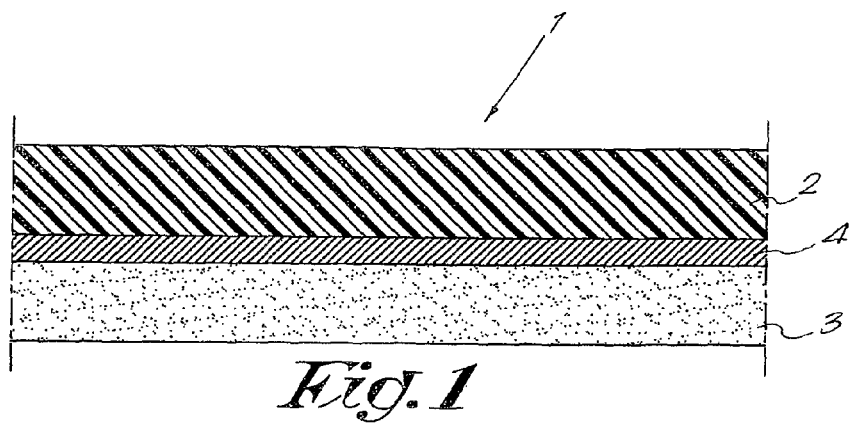
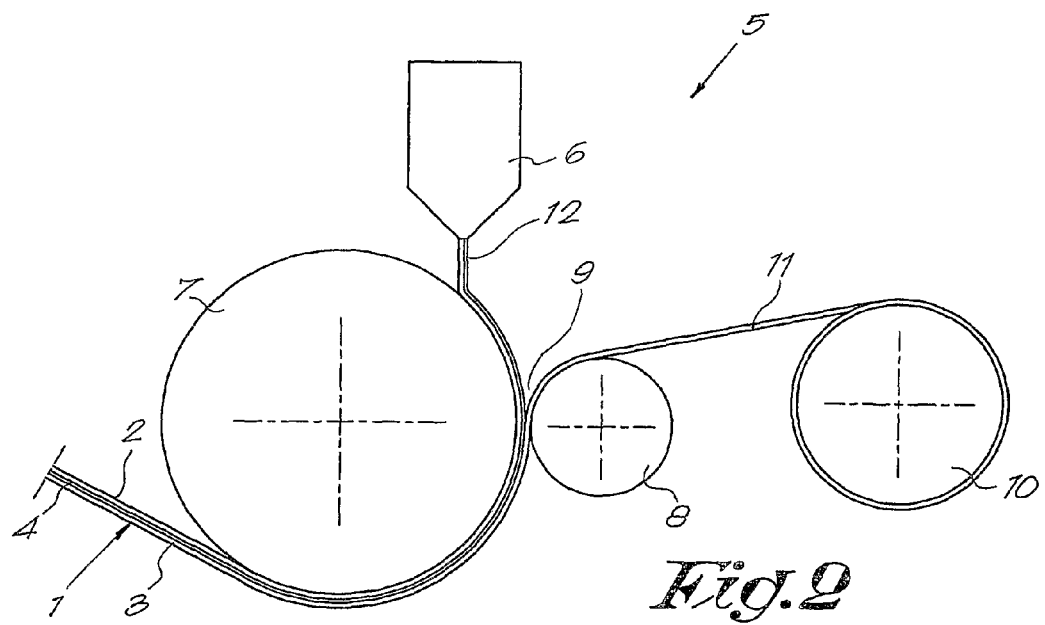

FILM FOR PACKING LIQUIDS OR THE LIKE AND METHOD FOR MANUFACTURING SUCH A FILM

The present invention concerns a film for packaging liquid products or the like, in particular for packaging pharmaceutical and/or cosmetic products in a liquid, semi-liquid, dissolved, gelatinous, emulsified state or the like.

In the pharmaceutical sector as well as in the cosmetics industry, the demands for the material out of which the packaging is made are very high as far as transparency is concerned, chemical and biochemical reactivity, absorption power, permeability, etcetera.

These demands are all the higher when a packaging is concerned in which liquids or the like are stored which may contain a large variety of components, such as for example polar components, non-polar components, ions, salts, oils, surface-active components, anti-microbial components, macromolecules and the like.

Although, in the above-mentioned sectors, synthetic packagings are already applied for storing solid materials, these packagings do not meet the demands for storing liquid products, due to too much permeability, too much reactivity, too much absorption power or the like.

Up to now, the pharmaceutical industry uses mainly glass packagings, as glass is a suitable recipient for storing such products, but a glass packaging also has major shortcomings.

Thus, for example, glass ampoules are known in which a dose of a medicine or the like to be injected is stored, whereby the tip of the ampoule can be broken off before use at a narrowing in the neck of the ampoule.

These known glass ampoules are disadvantageous in that they are fragile and have to be packaged with care; moreover, breaking off the tip of the ampoule is not simple, and users can hurt themselves on the glass. It should be noted that when breaking off the tip of the ampoule, minuscule glass particles may end up in the content of the ampoule, which is at least undesirable.

Another disadvantage of glass ampoules and of glass packagings in general is that they cannot be deformed, as a result of which they are difficult to stack or cannot be stacked at all without losing space.

Another disadvantage of glass packagings not being deformable is that, in many cases, a remainder of liquid will stick on the inside of the glass, as a result of which, when administering a precisely determined dose, a small deviation may occur.

Another disadvantage of the non-deformable character of glass packagings is that it is difficult to let a product flow out of a glass packaging at a constant flow rate, requiring for example extra pump systems for pharmaceutical products which have to be administered at a continuous flow rate.

Further, glass cartridges are known which are applied for storing injectable products. These cartridges are hermetically sealed by means of a rubber cap which is fixed to the glass by means of a lid made of, for example, aluminium.

The dose to be injected is hereby administered by means of a piston provided in the cartridge, whereby the content of the cartridge is guided through a small tube provided with a layer of silicone on the inside.

Although these cartridges make it possible to administer a well-dosed amount of medicine or the like, its construction is complex and its production is relatively expensive, especially when the different parts of the cartridge have to be sterilized.

Moreover, the silicone which is applied in the above-mentioned tube is non-desirable, as silicone may influence the composition of a medicine or the like stored in the cartridge, with possible pernicious consequences for the patient whom the medicine is being administered to.

In order to remedy several of the above-mentioned disadvantages, films are already known which can be used for packaging pharmaceutical or cosmetic products in a liquid state or the like, but these different known films all have specific major disadvantages.

Thus, films made of PVC (polyvinylchloride) are already known whereby components which are hardly or not soluble in water, absorb what are called non-polar components out of the stored product in the PVC, as a result of which the concentration of these non-polar components in the stored product decreases in time, and the products may thus lose their effective character.

Other known films, made for example of PE (polyethylene), PP (polypropene), poly-1-butene (PB) of the like, are in turn permeable to certain oils, such as for example paraffin oil, so that, when such a packaging is used for such oils, the packaging will feel greasy for example after a few days, and which results in an unacceptable loss of oil; also certain surface-active components, such as dodecane, migrate particularly fast through PE films or the like.

Also other known films, such as films made of acrylonitrile-methylacrylate co-polymer cannot be used for storing products with a wide range of components, as such films appear to be non-resistive to the large reactivity of for example peroxide derivatives, which are applied in cosmetics because of their bleaching properties, and as such films are not sufficiently impermeable to moisture.

Finally, there are also multilayered films.

Thus, films are known with an inner layer made of acrylonitrile-methylacrylate (A/MA/B), followed by a jointing layer, with which is bonded a layer of a co-polymer from PCTFE (polychlorotrifluoroethylene).

A disadvantage of these known films is that the A/MA/B discolours during the sterilization by means of radiation, as a result of which the content of a packaging on the basis of such a film will not be clearly visible when it is finally used, so that a possible precipitation of for example macromolecules cannot be visually detected when administering the stored product.

In another known PCTFE film, the inner layer consists of ethylene acrylic acid (EAA), whereby the EAA is disadvantageous in that it is reactive in relation to certain polar and aliphatic components, which components consequently cannot be stored in such a film without their composition being altered after a while.

In another PCTFE film, a film which is 7.5 µm (micrometer) thick made of PCTFE copolymer is used which is limited by a jointing layer on the inner side of the packaging, onto which is provided a PE layer.

The disadvantage of this known film is that tests have proven that the PCTFE layer of a PCTFE copolymer lets more water vapour through than a film made of homopolymer PCTFE. Moreover, a PCTFE polymer layer with a thickness of 7.5 µm lets water vapour through relatively quickly, so that the concentration of certain components of the products which are stored in this packaging may increase as the water evaporates through the packaging.

By the word homopolymer is hereby meant a polymer which is built up of a chain of identical molecules, in this case chlorotrifluoroehtylene, whereby all the molecules, to the exception of the terminal ones, are covalently connected in an identical manner.

The present invention aims a packaging which offers a solution to the above-mentioned and other disadvantages.

To this end, the invention concerns a packaging for liquid products or the like, which mainly consists of a first polyolefin layer, a jointing layer and a layer of polychlorotrifluoroethylene (PCTFE), whereby the PCTFE layer has a thickness of at least 10 micrometer (μm) and whereby the film is obtained by means of extrusion lamination or co-extrusion lamination.

By the term polyolefin are hereby understood polymers which are mainly built up of carbon atoms and hydrogen atoms, such as for example polyethylene, polypropylene, 1-butene, 4-methyl pentane, etc.

The PCTFE layer is preferably made of homopolymer PCTFE.

The layer of homopolymer PCTFE preferably also has a thickness of at least 50 μm.

An advantage of this film is that, partly thanks to the thickness of the PCTFE layer and the fact that homopolymer PCTFE is being applied, it is relatively impermeable to products in a liquid state or the like, as well as to gaseous products.

Another advantage is that the film according to the invention is transparent and does not discolour under the influence of ionizing radiation, which is typically used to sterilize among others packaging materials, which has as a plus that the film, after sterilization by means of radiation, stays optimally transparent, so that the quality of products packaged in the film can always be visually checked.

Preferably, the jointing layer also consists of a co-polymer made of a polyolefin and glycidyl methacrylate, such as for example ethylene glycidyl methacrylate co-polymer (EGMA), which offers the advantage that this jointing layer is practically not affected by migrating components of the packaged product, so that the compound of the film layers is not broken.

An advantage of the thus obtained film composition is that the used materials, in the state in which they are in the film, are chemically practically inert and absorb relatively little or no components at all.

An advantage linked to this is that, thanks to the inertness of the packaging film according to the invention and the good sealing which can be obtained with this film, the composition of the packaged products will change only little in time, as a result of which the packaged products will have a longer shelf life.

Apart from a film for packaging liquid products or the like, the present invention also aims a method which makes it possible to manufacture such a film.

Up to now, no method was known for manufacturing a PCTFE film with a relatively large thickness, as described above.

To this end, the invention concerns a method which can be applied for manufacturing a film according to any of the preceding claims, whereby the jointing layer is extruded, characterised in that the jointing layer and the above-mentioned foil of PCTFE, together with a polyolefin layer, are compressed between a first roller and a second roller, whereby the PCTFE foil is thus laminated to the jointing layer.

An advantage of this method according to the invention is that, by bonding the jointing layer with the PCTFE foil by means of lamination, any thickness whatsoever of PCTFE foil can be used.

Another advantage which is linked to the application of an extrusion lamination is that, when manufacturing the film, the difference in viscosity between the jointing layer, PCTFE and possibly the applied polyolefin does not have to be taken into account, as these substances can be extruded at different moments, so that a larger range of polyolefins can be applied, as well as a larger range of substances which can be applied as jointing layer.

In order to better explain the characteristics of the invention, the following preferred embodiment of a film according to the invention for packaging liquid products or the like, as well as some preferred embodiments of the methods according to the invention for manufacturing the above-mentioned film are described as an example only without being limitative in any way, with reference to the accompanying drawings.

BRIEF DESCRIPTION OF THE DRAWINGS

FIG. 1 schematically represents a film according to the invention seen as a section;

FIG. 2 represents a method for manufacturing a film according to the invention;

FIG. 1 represents a film 1 according to the invention for packaging liquid products or the like, which mainly consists of a first layer 2 and a PCTFE layer 3, in between which is provided a jointing layer 4.

Figure 3:
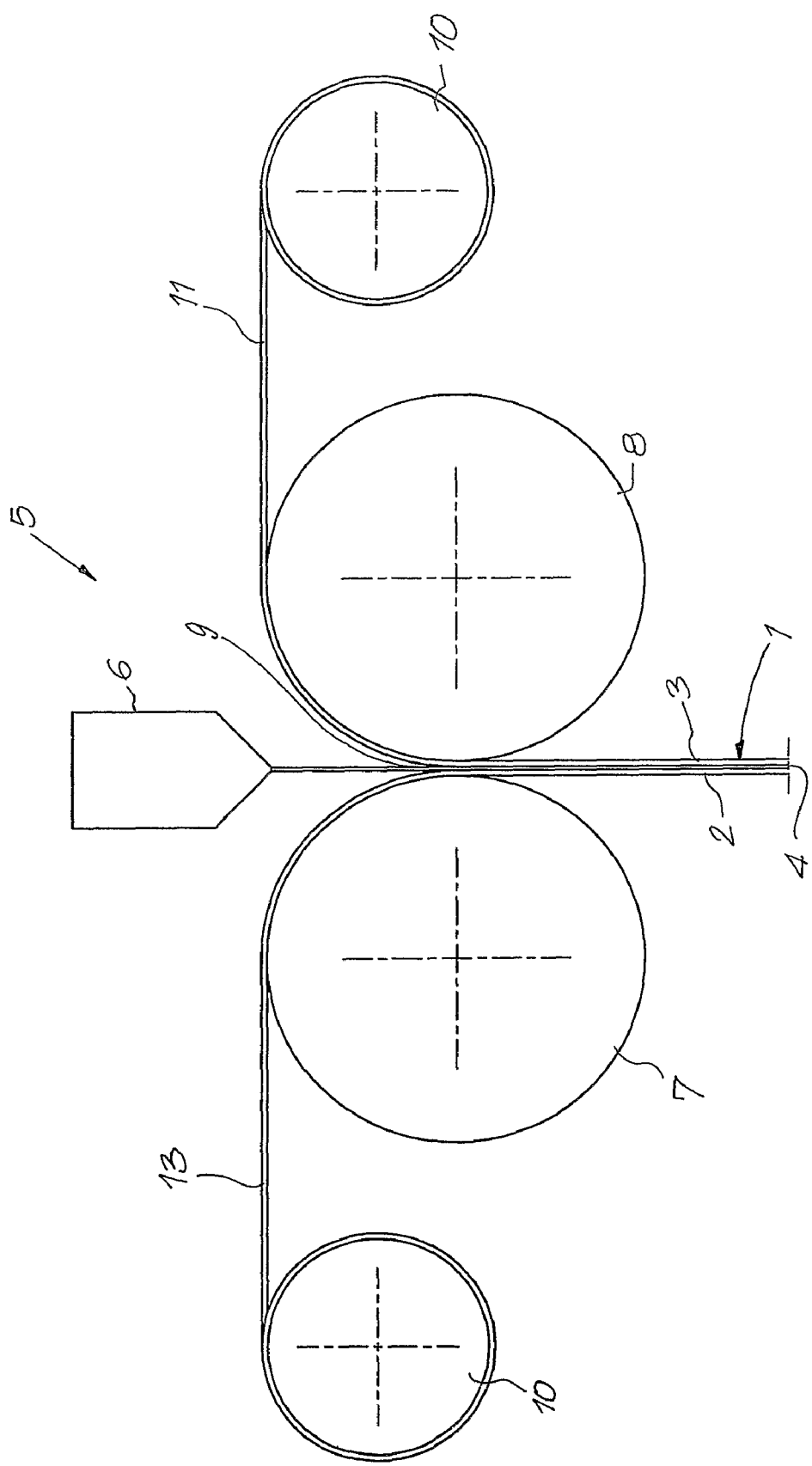
FIG. 3 represents a variant of FIG. 2.

The first layer 2, in particular the layer which is designed as contact layer for the content of the packaging, consists of a transparent, colourfast and inert synthetic layer, which in this case consists of a polyolefin such as PE, PP and/or PB, which are homopolymers.

The thickness of the first layer 2 may vary between 5 μm and some 1000 μm, with a preferred thickness of some 20 to 50 μm.

The PCTFE layer 3 preferably consists of homopolymer PCTFE and has a thickness of at least 10 μm and preferably at least 50 μm.

The jointing layer 4 consists, just as the first layer 2, of a transparent and colourfast synthetic material, for example a co-polymer of ethylene and glycidyl methacrylate having a thickness of 3 to 50 μm or, preferably, a thickness of 3 to 10 μm.

Such a film 1 is particularly suitable for packaging pharmaceutical or cosmetic products in a liquid state or the like and which may contain a wide range of components, including for example oils, such as paraffin oil; solutions of macromolecules, such as for example proteins, etc.

As PE, PP and/or PB are preferably used as a first layer 2, which synthetic materials can for example be welded under the influence of heat, the packaging can be sealed quickly and in a simple manner.

Consequently, the film 1 can be applied as a packaging in the shape of for example little bags or in place of glass ampoules for any of the above-mentioned components.

Naturally, it is always possible to coat the film 1 on the outside, in particular on the PCTFE layer 3, with other layers, for example a rigid synthetic layer to reinforce the film 1, or with other functional coatings.

It is also possible to manufacture symmetric films, whereby a jointing layer 4 and a polyolefin layer 2 are again provided on the outside, on the PCTFE layer 3, thus creating a film 1 which can be used on either side.

It is also possible to provide an extra functional layer on the inside of the film 1, in particular on the polyolefin layer 2, such as for example a layer made of terpolymers of PE or the like, which makes it possible to better weld the film 1 onto itself or which provides another weld strength to the film 1.

Further, it should be noted that EGMA co-polymer is not the only jointing layer 4 which can be applied; also other substances or combinations of substances can be applied, either or not depending on the purpose for which the film 1 is designed.

Other possible jointing layers consist for example of ethylene-methyl acrylate-glycidyl methacrylate terpolymers; ethylene-acrylate co-polymer; terpolymers of ethylene, ester acryl groups and glycidyl methacrylate; and other ones, also including two-layered or multilayered jointing layers.

The above-described film 1 can be manufactured in a simple manner by means of a device 5 and a method, which will be described hereafter.

The device 5 for manufacturing a film 1 according to the invention is represented in FIG. 2 and mainly consists of an extrusion device 6 and two rollers 7 and 8 placed opposite to each other, whereby a longitudinal passage 9 is provided between the rollers whose width is somewhat smaller than or equal to the thickness of the film 1 to be manufactured.

Both rollers 7 and 8 are preferably provided with a heat regulation and a drive, which are not represented in the figures, whereby the second roller 8 is in this case coated with a flexible material, such as rubber.

Further, the device 5 also comprises a feed roller 10 onto which is wound a foil 11 of homopolymer PCTFE.

The method for manufacturing the film 1 by means of the above-mentioned device is simple and as follows.

PE, PP and/or PB are simultaneously extruded with EGMA in the known manner on the first roller 7, whereby a two-layered foil 12 of PE or the like and EGMA co-polymer is formed.

The formed two-layered foil 12 is carried off as a result of a rotation of the first roller 7 in the direction of the passage 9 between the two rollers 7 and 8, which rotate in opposite directions.

The PCTFE foil 11 is guided from the drive roller 10 over the second roller 8 and pressed against the EGMA co-polymer side of the two-layered foil 12 between the first roller 7 and the second roller 8, whereby the PCTFE foil 11 and the two-layered foil 12 are laminated, such that the film 1 is created, in which the EGMA co-polymer layer forms the above-mentioned jointing layer 4, and whereby the set temperatures of the first roller 7 and of the second roller 8 play a major part in bonding the two-layered foil 12 with the PCTFE foil 11.

According to a variant of this method, which is represented in FIG. 3, the EGMA co-polymer is extruded between a polyolefin foil 13 which is partly unwound over the first roller 7 and the PCTFE foil 11 which is guided over the second roller 8. Between both rollers 7-8, the different foils 11, 13 and the EGMA layer are laminated.

The invention is by no means limited to the above-described embodiment given as an example and represented in the accompanying drawings; on the contrary, such a film for packaging liquid products or the like according to the invention and a method which can be applied for manufacturing such a film can be made in all sorts of shapes and dimensions and according to different variants while still remaining within the scope of the invention.

The invention claimed is:

1. Film for packaging liquid pharmaceutical or cosmetic products containing components with a large reactivity, comprising a first homo-polymeric polyolefin layer which is polyethylene or polypropylene, a jointing layer of a copolymer of ethylene and glycidyl methacrylate (EGMA) and a layer of polychloro-trifluoroethylene (PCTFE), wherein the PCTFE layer has a thickness of at least 10 micrometer ($\mu$m) and the film being extrusion laminated.

2. Film according to claim 1, wherein the polyolefin layer and the jointing layer are co-extrusion laminated with the PCTFE layer.

3. Film according to claim 1, wherein the PCTFE layer is made of a homopolymer PCTFE.

4. Film according to claim 1, wherein the PCTFE layer has a thickness of at least 20 $\mu$m.

5. Film according to claim 1, wherein the polyolefin is polyethylene.

6. Film according to claim 1, wherein the polyolefin is polypropylene.

* * * * *